Figure 4:
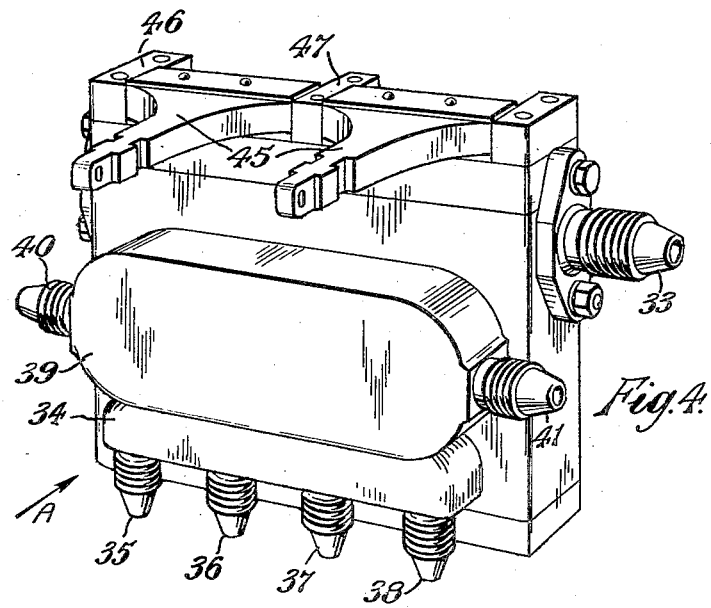

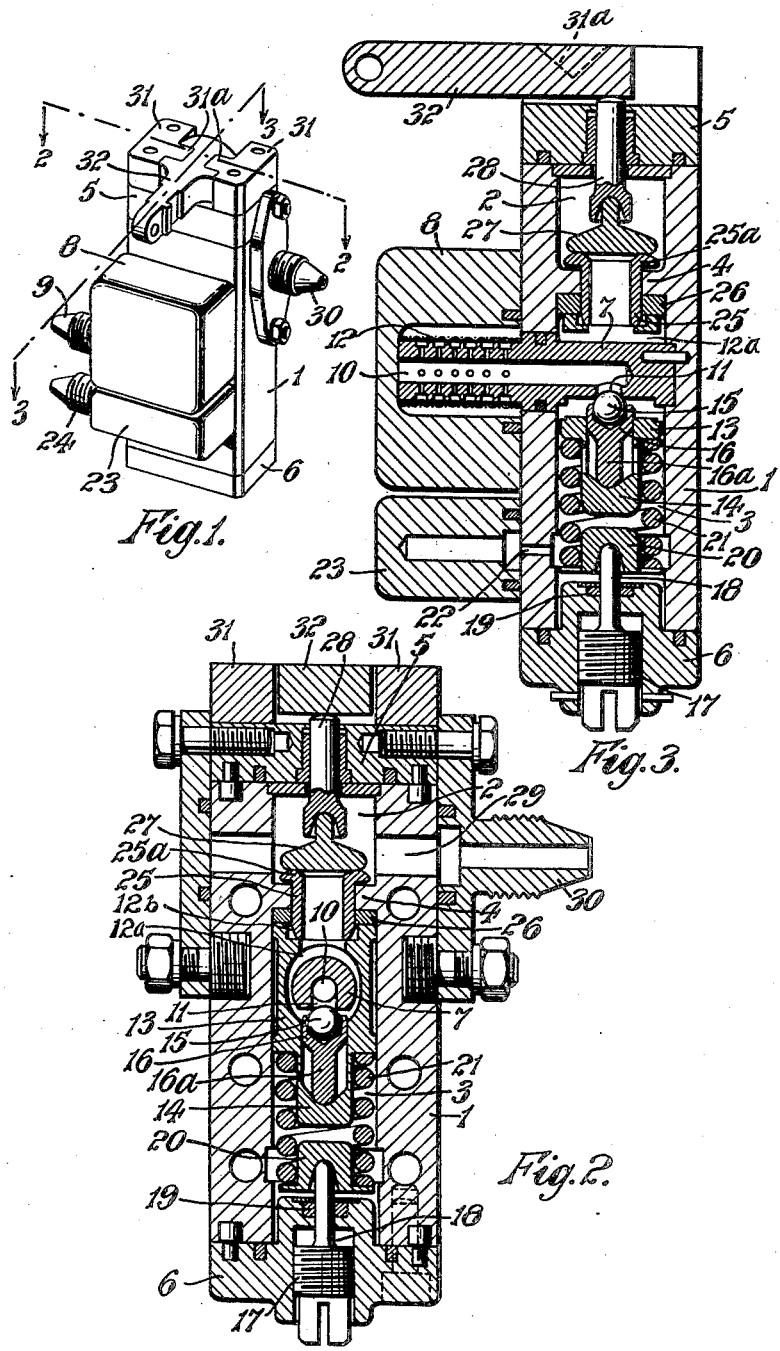

June 29, 1954  H. W. TREVASKIS  2,682,282
FLUID PRESSURE CONTROL VALVE
Filed Dec. 6, 1950  4 Sheets-Sheet 2

INVENTOR
Henry William Trevaskis
by Benj. T. Rauber
his attorney

June 29, 1954   H. W. TREVASKIS   2,682,282
FLUID PRESSURE CONTROL VALVE
Filed Dec. 6, 1950   4 Sheets-Sheet 3

INVENTOR
Henry William Trevaskis
by Benj. T. Rauber
his attorney

June 29, 1954  H. W. TREVASKIS  2,682,282
FLUID PRESSURE CONTROL VALVE
Filed Dec. 6, 1950  4 Sheets-Sheet 4

INVENTOR
Henry William Trevaskis
by Benj. T. Rauber
his attorney

Patented June 29, 1954

2,682,282

UNITED STATES PATENT OFFICE 2,682,282

FLUID PRESSURE CONTROL VALVE

Henry William Trevaskis, Solihull, England, assignor to Dunlop Rubber Company Limited, London County, England, a British company Application December 6, 1950, Serial No. 200,021

Claims priority, application Great Britain December 8, 1949

14 Claims. (Cl. 137—622)

This invention relates to fluid pressure control valves, and more particularly to valves for selectively controlling hydraulic operated mechanisms, for example, aircraft brakes.

The majority of known fluid pressures control valves rely for their operation upon axially-movable means, e. g. an operating rod, movement of which will first close an exhaust valve and then open an inlet valve. Pressure from the source flows into the valve to overcome spring means and close the inlet valve when the operating pressure determined by linear movement of the operating rod, has been attained.

Valves of this nature have several disadvantages, particularly when used to selectively control fluid pressure operated brakes for aircraft. For example, the pilot cannot "feel" the brake and has little indication of the pressure reacting at the braking surfaces apart from noting the amount of travel of the hand lever or foot pedal, or alternatively observing the behaviour of the aircraft on the ground. Thus control of the brakes tend to become somewhat haphazard. Another disadvantage lies in the fact that it is necessary to exert considerable force on the operating rod to "crack" the inlet valve against fluid-pressure from the source. This initial force varies of course with the inlet pressure and the area of the valve seat, but may be of the order of 30–60 lbs.

Other disadvantages of valves of this nature lie in the number of fluid-tight sliding joints required, since pressure fluid is liable to leak therethrough, particularly at high altitudes, and sealing rings, where provided at said joints, are known to deteriorate at extremes of temperature. The springs, too, are apt to weaken in service thus making the valves unreliable. The efficiency and accuracy of this type of valve is therefore low. Valves of this nature have also to be serviced at frequent intervals, are expensive to produce, and some are of appreciable bulk, and heavy.

The object of this invention is to provide a fluid pressure control valve wherein the operating plunger has negligible movement and a very light force only is required to open the inlet valve. Another object of the invention is to provide a valve wherein the operating pressure is directly proportional to the force on the operating plunger. Yet another object of the invention is to provide a valve which is small, light and compact and has a small number of movable parts.

According to the invention a fluid pressure control valve unit comprises a housing containing an operating chamber adapted to be connected to a mechanism to be operated and an exhaust chamber adapted to be connected to exhaust, an exhaust valve between said chambers, an inlet valve controlling the flow of pressure fluid from a source into the operating chamber, spring-loaded means to maintain said inlet valve closed against fluid pressure from the source and means associated with the inlet and exhaust valves movable in one direction by an operator to close the exhaust valve and allow the inlet valve to open and in the opposite direction by the fluid pressure in the operating chamber to allow the inlet valve to close.

According to the invention also a fluid pressure control valve unit comprises a housing containing an operating chamber adapted to be connected to a mechanism to be operated and a co-axial exhaust chamber adapted to be connected to exhaust, a co-axial passage between said chambers, an inlet connection adapted to be connected to a source of fluid pressure and communicating with said chamber through an inlet valve, a cradle axially slidable in the operating chamber and associated with said inlet valve, a compression spring urging the cradle in a direction to close the inlet valve, an exhaust valve seat, in the exhaust chamber having a tubular portion slidably fitting in the passage between said two chambers and seating on the adjacent end of the cradle, an exhaust valve seating on said exhaust valve seat and a plunger associated with said exhaust valve and slidably passing through a hole in the exhaust chamber and projecting exterior of said housing, whereby a load on said plunger in one direction first closes the exhaust valve and then compresses the spring to allow the inlet valve to open and pressure fluid to flow into the operating chamber until the pressure in said chamber, acting on the face of the exhaust valve, overcomes the load on the plunger to move the valve and allow the inlet valve to close.

Preferably a fluid pressure control valve comprises a plurality of such valve units secured together in a common housing in side by side relationship. Such valves are of particular value in controlling the supply of pressure fluid to aircraft wheel brakes, for example, a control valve comprising two valve units may be used, one valve unit controlling the pressure flow to each of the two wheel brakes, whilst a brake valve comprising four valve units may be used when each of the wheel brakes is provided with alternative operating means.

The valve unit, or the valve, where two or more units are provided, may be controlled by means of a column of hydraulic fluid, by linkage or by flexible cable. Means may be provided, when the valve is used for operating wheel brakes, for parking said brakes.

Figure 5:
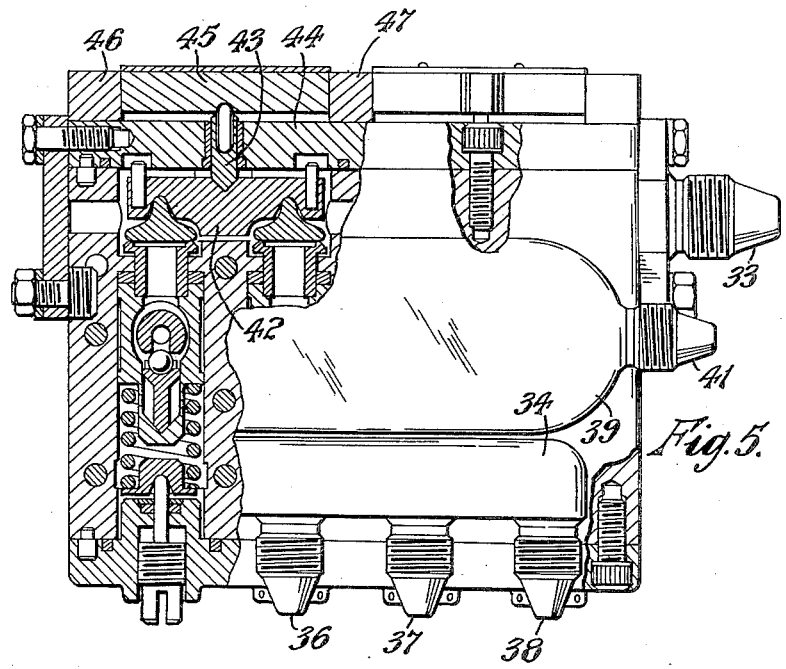
Figure 6:
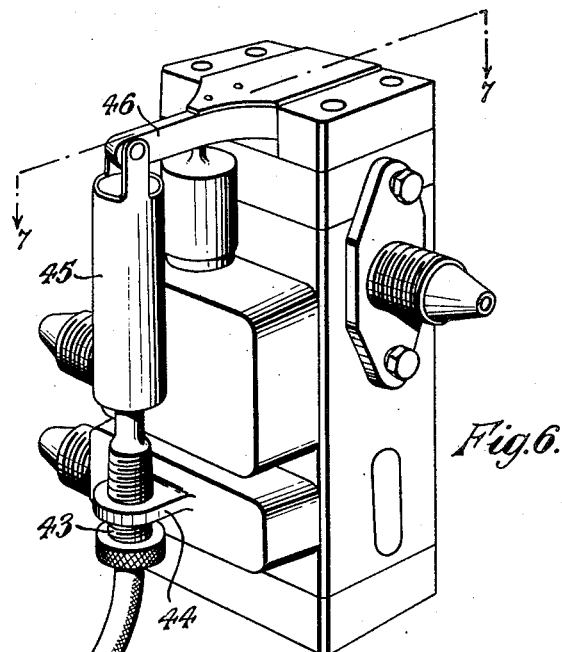
Figure 7:
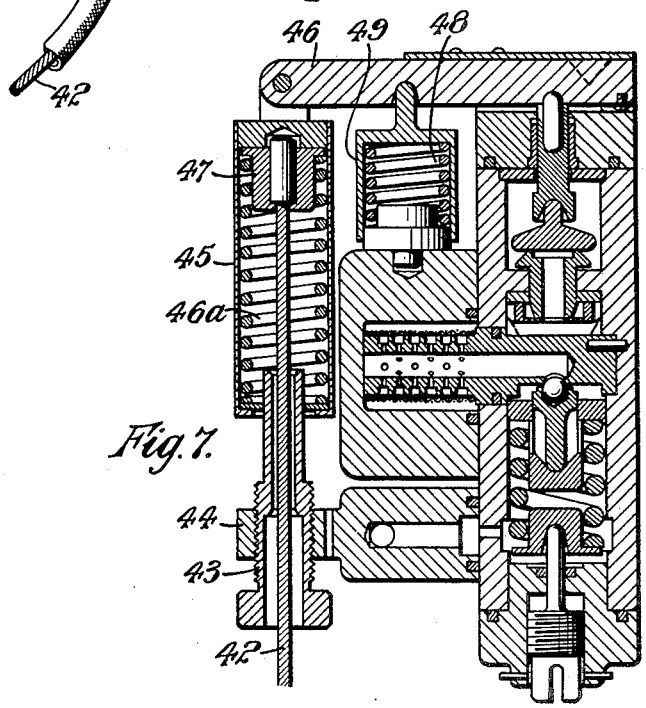
Figure 8:
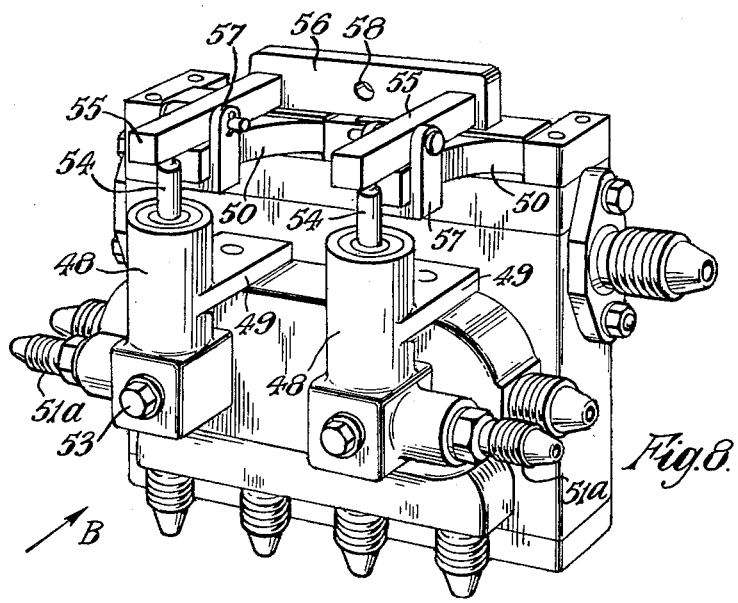
Figure 9:
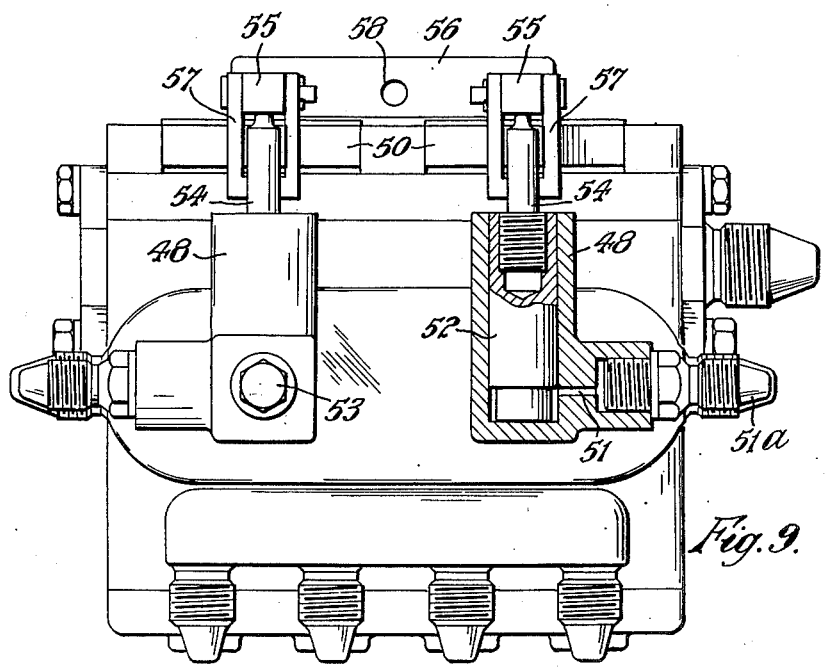

In order that the invention may be more fully described, reference is made to the accompanying drawings, of which:

Figure 1 is a perspective sketch of a single valve unit made in accordance with the present invention, Figure 2 is a section through 2—2 of Figure 1, looking in the direction of the arrows, Figure 3 is a section through 3—3 of Figure 1, looking in the direction of the arrows, Figure 4 is a perspective sketch of a brake control valve incorporating four valve units, Figure 5 is a view of Figure 4, partly in section, looking in the direction of arrow A, Figure 6 is a perspective sketch of a single valve unit showing cable-operated control means, Figure 7 is a section through 7—7 of Figure 6, looking in the direction of the arrows, Figure 8 is a perspective sketch of a brake control valve comprising four valve units and provided with hydraulically operated control means and means for maintaining the valve open at any selected pressure, and Figure 9 is a view of Figure 8, partly in section, looking in the direction of arrow B.

In one embodiment of the invention a control valve consists of a single valve unit (Figures 1, 2 and 3) comprising a housing 1, containing two pressure-tight and co-axial chambers, an exhaust chamber 2 and an operating chamber 3. The two chambers communicate through a circular hole in a wall 4 separating said chambers, and the exhaust chamber 2 is provided, at one end of the housing, with a closure member 5 and the operating chamber 3 is provided, at the other end of the housing, with a closure member 6.

An inlet connection 7 is fitted in fluid-tight manner through a hole in the side wall of the housing and said inlet connection extends diametrically across the operating chamber and is pegged to the side of the operating chamber remote from said hole. A part of said connection extends exterior of the housing and this part is located within a chamber in a filter housing 8 secured to the exterior of the housing, the end of said part abutting the base of the chamber. A nozzle 9, adapted to be connected to a source of fluid pressure, is secured to the filter housing and communicates with said chamber. A conduit 10 extends axially through the centre of the inlet connection and terminates at one end in a hole 11 extending radially through the inlet connection on that side of the inlet connection remote from the exhaust chamber 2, and communicating with the operating chamber 3. The hole 11 is co-axial with the operating chamber 3. A plurality of radially extending holes are provided through the part of the inlet connection inside the filter chamber to connect said chamber with the conduit 10 extending through the connection, and a filter element 12 is closely fitted over the exterior of said part to prevent the ingress of foreign matter to the valve mechanism.

A cradle 13 is slidably fitted within the operating chamber 3, said cradle being provided with a radially-extending aperture 12a of substantially oval section through which the inlet connection 7 projects, as shown in Fig. 3, the arrangement being such that the inlet connection does not foul the cradle during the range of axial movement of said cradle. An extension 14, of smaller diameter than the cradle extends axially from the end of the cradle remote from the exhaust chamber, said extension being provided with an axially-extending hole communicating with the aperture in the cradle. A ball 15, adapted to seat on the lip of the hole 11 is held in a cup-shaped member 16 located in the extension of the cradle, having a stem 16a abutting the bottom of the hole in said extension.

The closure member 6 is provided centrally, on the side remote from the operating chamber, with an axially extending threaded hole, and an adjusting screw 17 is fitted within said threaded hole. A stem 18, integral with the adjusting screw, extends axially through a hole in the closure member into the operating chamber, a sealing ring 19 being provided at the interface to prevent leakage of pressure fluid therethrough.

The end of the stem within the operating chamber fits loosely into a substantially conical hole in a flanged spring bearing member 20 and a coiled helical spring 21 is interposed in compression between said spring bearing member and the adjacent end of the cradle.

The wall of the housing is provided with a conduit 22 communicating at one end with the operating chamber and at the other end with a brake manifold 23 which is secured to the exterior of the housing. A nozzle 24 secured to said manifold and communicating, through the manifold and conduit, with the operating chamber, is adapted to be connected to an associated fluid pressure operated mechanism.

The end of the cradle remote from the extension 14 is provided with an axially extending hole communicating with the aperture 12a of oval section extending radially through the cradle, and the end of the cradle is recessed to a larger diameter than the hole to form a step 12b. An exhaust valve seat is provided comprising a tubular portion 25 which slidably fits through the hole in the wall 4 between the chambers 2 and 3 and has one end seated on the step of the cradle. The end of the tubular portion projecting into the exhaust chamber is provided with a flange 25a extending radially outwards and the upper end of the flange is provided with an axially-extending seat portion flared outwardly at the upper end of the passage through the tubular element. An annular sealing ring 26 is located between the wall 4 and the associated end of the cradle, the inner periphery of the ring also contacting the tubular portion of the valve seat. Leakage of pressure fluid along the interface between the said tubular portion and the side of the hole through which it is slidably fitted is thus prevented.

An exhaust valve 27 seats on the exhaust valve seat, the end of the valve being located in a conical hole in one end of a plunger 28 which extends axially through a hole in the closure member 5. A conduit 29, Fig. 2, extends through the wall of the housing and has one end communicating with the exhaust chamber and the other end communicating with a nozzle 30 secured to said housing, which is adapted to be connected to exhaust.

Two rectangular knife-edge supports 31 of square section are secured to the closure member 5, said supports being parallel and spaced one at each side of the face of the closure member. The supports are provided on their adjacent faces with integral knife-edges 31a, Figs. 1 and 3, said knife-edges extending towards one another and their ends being spaced a short distance apart. The apex of each knife-edge is presented towards the adjacent closure plate, said apices being colinear, spaced a short distance from and parallel to the closure member, and off-set to one side of the centre of the closure member.

A lever 32 is provided which is fitted between the adjacent faces of the two knife-edge supports and has two V-section notches in which the knife-edges are located. One end of the lever contacts the end of the plunger projecting out of the closure member, and the knife-edges are situated adjacent the end of the lever associated with the plunger. A mechanical advantage of about 5:1 is obtained through the lever.

The various parts of the valve are so arranged that the force of the spring acting in one direction, i. e. tending to close the inlet valve, just overcomes the pressure from the source, acting in the opposite direction through the hole 16 in the inlet connection on the area of the ball covered by the hole. The ball is thus maintained in contact with the lip of the hole, and fluid pressure from the source is prevented from entering the operating chamber. In this position of the cradle, the end of the cradle is abutting the sealing ring 26 and the tubular exhaust valve seat is in contact with the exhaust valve Fig. 3. A small gap is provided between the flange 25a of the exhaust valve seat and the wall 4 between the two chambers.

To operate the valve an upward load is applied to the end of the lever and thus a considerably increased downward load is applied to the end of the plunger. This force, acting through the exhaust valve, exhaust valve seat and cradle compresses the helical spring and allows the fluid pressure from the source to force the ball off its seating. Pressure fluid thus flows into the operating chamber and thence through the conduit 22 and nozzle 24 to the mechanism to be operated. The movement of the cradle to crack the inlet valve, is extremely small, e. g. 0.0005 to 0.001 inch and this movement is imperceptible even when magnified by the lever. Only a very light force is necessary on the plunger to compress the spring and allow the inlet valve to open, and this force is considerably reduced at the point of application, i. e. at the end of the lever.

With the inlet valve open, the pressure in the operating chamber rapidly increases and reacts against the operative face of the exhaust valve. When this upward force on the valve just exceeds the downward force on the plunger, the valve moves away from the operating chamber, thus permitting the spring-urged cradle to move the same distance after it. The ball associated with the cradle will then seat on the hole in the inlet connection and prevent the flow of pressure fluid from the source therethrough. The force on the valve exerted by the plunger will be sufficient to keep it seated on the exhaust valve seat, and so long as this force is maintained on the plunger the exhaust valve remains closed.

To increase the operating pressure the downward force on the plunger is increased. This force will overcome the upward force on the exhaust valve and force the valve, valve seat and cradle downwards against the spring, permitting the ball to move away from its seating and once more opening the inlet valve. Pressure fluid from the source will again flow into the operating chamber and thence to the mechanism to be operated until the upward force on the exhaust valve overcomes the downward force on the plunger and closes the inlet valve once more, the exhaust valve remaining closed.

To release or reduce the operating pressure the downward load is removed or reduced from the plunger. The pressure in the operating chamber forces the exhaust valve upwards and, if the inlet valve is not already closed, said valve will close before the exhaust valve quits its seating and allows fluid pressure to flow through the valve to exhaust.

It will thus be seen that whilst in the conventional known valve the amount of operating pressure depends upon the linear movement of the operating rod alone, in a valve constructed in accordance with this invention the amount of operating pressure is determined by the load on the operating plunger, the linear movement being negligible. This makes the valve extremely sensitive, particularly when a lever arm is employed, as herein described. The load on the plunger and on the end of the lever is always in direct proportion to the pressure in the operating chamber and hence in the mechanism to be operated. The operator, through manual pressure of his thumb or fingers on the end of the lever is able to "feel" the actual operating pressure at any time. He can thus control the mechanism to be operated with far more precision than hitherto. Since there are few moving parts, and the actual movement of those parts is negligible there is practically no loss due to friction and the like. The only spring in the valve unit is for the purpose of seating the inlet ball valve. The rating of this spring is readily adjustable.

The upward load exerted by the spring 21 on the cradle to seat the ball 15 should always just balance the downward load on the ball caused by the originating pressure acting on the seating area of the ball. During the operation of the valve, however, as the pressure in the operating chamber 3 increases, the upward load on the cardle is augmented by the operating chamber pressure, acting upwardly on an area of the ball equal to the seating area, so that when the downward originating pressure and operating chamber pressures are equal the ball is substantially balanced, and there is little or no downward force opposing the upward thrust of the spring on the cradle. The effective upward thrust of the spring thus varies from a minimum when the operating chamber is lightly pressurized to a maximum when the chamber is fully pressurized. The effect of this is that in the absence of some compensation, the load on the plunger required to crack the inlet valve would not remain directly proportional to the operating pressures but increases faster than the increase in said pressure.

This difficulty is overcome by the provision of the outwardly extending flange 25a, as hereinbefore described, between the end of the tubular member 25 in the exhaust chamber and the exhaust valve seat.

The dimensions of parts are such that the effective area of the exhaust valve 27 minus the outside area of the tubular member 25 is equal to the area of the inlet valve hole 11. The spring 21 should always be strong enough just to keep the ball 15 on its seating against the pressure from the source. With this combination of parts the cradle is balanced throughout the range of operating chamber pressures, and the reaction on the effective area of the exhaust valve, which can be felt by the operator, is always proportional to said pressures.

The upward load on the cradle exerted by the spring may be varied by adjustment of the adjusting screw 17.

Whilst a valve constructed in accordance with the invention has many uses, its chief use is in connection with the controlling of the flow of pressure fluid to aircraft wheel brakes. For this purpose two valve units constructed in accordance with the invention may be incorporated in a single housing, said valve units having a common inlet for pressure fluid from the source, a common exhaust and a separate outlet to each of the two wheel brakes of the aircraft. Each of the two valve units may be independently operated to give differential braking, e. g. for steering purposes, or the units may be coupled up and applied together.

Preferably, however, a valve for the operation of fluid-pressure operated aircraft wheel brakes comprises four identical valve units located side by side in a single housing. Such a valve is particularly suitable for aircraft brakes having alternative operating mechanisms, such e. g. as the double piston and cylinder mechanism described and claimed in B. P. specification No. 631,8800. In this embodiment of the invention, which is illustrated in Figures 4 and 5 of the accompanying drawings, the exhaust chambers of the valve units are interconnected and communicate with a nozzle 33 which is adapted to be connected to exhaust. A member 34 secured to the side of the housing is provided with four nozzles 35, 36, 37 and 38, each connected with the operating chamber of its associated valve. Nozzles 35 and 36 are adapted to be connected to each of the alternative braking mechanisms associated with one wheel brake whilst nozzles 37 and 38 are adapted to be connected to each of the alternative braking mechanisms associated with the other wheel brake. A common filter housing 39 is provided, having two nozzles 40 and 41, one at each end thereof, and each nozzle is adapted to be connected to a separate source of fluid pressure. The nozzle 40 communicates with the inlet connections of the valve units associated with operating nozzles 35 and 37, whilst the nozzle 41 communicates with the inlet connections of the valve units associated with operating nozzles 36 and 38.

A bridge-piece 42 is provided at each end with a substantially conical hole and is fitted over the exhaust valves of the two adjacent valve units associated with operating nozzles 35 and 36, the stems of said valves seating in said holes. A plunger 43, slidably fitting through a hole in the closure plate 44 has one end seated in a recess in the bridge-piece centrally between the two valves and on the side of the bridge-piece remote from the valves. The other end of the plunger abuts one end of a substantially triangular lever 45 located on knife-edges carried on two knife-edge supports 46 and 47 in a manner described in connection with the single valve unit. The other pair of adjacent valve units, i. e. those associated with nozzles 37 and 38 are similarly connected together with a bridge-piece, plunger and triangular lever substantially as hereinabove described.

A load on the ends of the two levers will produce a proportionate increase in load on the associated plungers and half the load on each plunger will be transmitted to each of its associated exhaust valves. With pressure fluid from the source flowing through both the inlet nozzles 40 and 41, all four valves will be operated in the manner hereinabove described. If pressure is flowing only through one inlet nozzle only two valves will be operated, e. g. with the nozzle 40 the two valves associated with operating nozzles 35 and 37 will be operated. In this case the ends of the two bridge-pieces will pivot about the exhaust valve stems of the non-operative valves, the resultant load on the operating valves being the same, for a similar load on the ends of the levers, as when all four valves are operating. Thus if one of the alternative brake-applying systems should fail, the brakes would be applied with the same pressure through the second alternative system for the same load on the lever.

Valves made in accordance with the invention may be operated directly by a pilot or other operator, i. e. they may be situated adjacent the operator so that the operator may apply a direct pull to the end of the lever.

In the majority of cases, however, the valves are situated remote from the operator, and means must be provided for applying a load to the end of the lever.

In another embodiment of the invention, therefore, shown in Figures 6 and 7 as applied to a single valve unit, said means comprises a length of flexible wire cable 42 having one end connected to a manually-operated brake lever of known type. The wire cable passes through a hollow sleeve 43 having a portion threadably engaging in a lug 44 carried on the side of the brake manifold. A smaller diameter portion of the sleeve slidably projects through a hole in one end of a tubular member 45, the other end of said member being pivotally secured to the end of the lever arm 46. A helical compression spring 46a is located in said tubular member and a cap 47 is fitted to that end of the spring adjacent the lever. The end of the wire cable is threaded through the spring and is secured to the cap.

In this embodiment of the invention the knife-edges about which the lever pivots are situated on the side of the plunger remote from the end of the lever on which the load is applied. The ratio of the lever remains at about 5:1; thus a downward load on the end of the lever results in an increased downward load on the plunger. A return spring 48 fitted in a telescopic housing 49 is interposed in compression between the lever arm and the top of the filter housing. This removes the load from the plunger as soon as the tension in the wire cable is removed.

The means for controlling the valve unit operates as follows. The brake lever is operated in the normal manner and linear movement of the wire cable takes place. The end of the cable is secured to the cap which abuts one end of the spring, hence as the cable and the cap move the spring is compressed against one end of the tubular member, thus exerting a load on the tubular member in a downward direction. The other end of the tubular member is connected to one end of the lever arm, hence the same load is transmitted to the lever arm, and the valve unit is operated in the manner described above. Linear movement of the cable against the force of the spring is thus converted into a load on the end of the lever arm with little or no movement of the lever arm. This means for operating the valve unit may also be applied to valves comprising two or more valve units.

In yet a further embodiment of the invention (not illustrated) a valve unit as herein described is remotely controlled through a column of hydraulic liquid. In this embodiment of the invention a piston and cylinder mechanism is secured to the side of the housing, the axis of said mechanism being parallel to the axis of the valve unit, and the piston is provided with a piston rod which is pivotally connected to the end of the lever. The cylinder is adapted to be connected to a conventional hydraulic foot-motor, under the control of an operator. Operation of the foot-motor pressurizes the column of hydraulic liquid which, acting through the piston and piston rod, applies a load to the end of the lever, thus operating the valve unit in the manner herein described. Valves comprising two or more valve units may be operated by these means, and the valve units may be coupled together and operated by a single means or they may each be operated by a separate means.

In yet a further embodiment of the invention, a valve for the selective control of aircraft brakes and comprising four valve units, substantially as described with reference to Figures 4 and 5 of the accompanying drawings, is operated through a column of hydraulic liquid, and means are provided for maintaining the brakes "on," for example, as in parking the aircraft.

Figures 8 and 9 show a valve comprising four valve units, of the type hereinabove described. Two cylinders 48 are secured to the filter housing, each by means of a flange 49. The axes of said cylinders are parallel to the axes of the valve units, and the axis of each cylinder is in line with the centre of each of the triangular lever members 50. A conduit 51 leads from the bottom of each cylinder 48 to a nozzle 51a, and each nozzle is adapted to be connected to a hydraulic foot-motor under the operation of the pilot. A piston 52 having a reduced diameter portion at the base thereof is slidably fitted in each cylinder, the conduit 51 communicating with the annular space between the bottom of the piston and the cylinder. A vent and bleed-screw 53 are also provided at the base of each cylinder for the purpose of bleeding the system.

A piston rod 54 is secured to the top of each piston and the end of the rod remote from the piston is pivotally seated in a recess in one end of a beam 55, the other end of which is rotatably fitted through a hole adjacent the end of a common bridge-piece 56 which normally rests across the tops of the knife edge supports secured to the closure member of the valve. A U-shaped knife-edge support 57 is pivotally dependent from the end of each beam adjacent the piston rod, the knife-edge portion being located at the base of the support and presented upwardly and the end of each lever member 50 is provided with a notch into which the associated knife-edge is fitted. The centre of the bridge-piece is provided with a hole 58 to which is attached a wire cable, the other end of which is attached to a conventional hand-brake.

The arrangement operates as follows. On operation of either of the foot-motors by the pilot, the hydraulic pressure forces the associated piston upwardly. This upward movement of the piston, acting through the piston rod, lifts the beam and causes the bridge-piece to make a small angular movement about the end of the non-operative beam. The upwardly-moving beam carries its associated knife edge with it and this lifts the end of the lever member to operate the valve in the manner hereinabove described. An increase of pedal pressure at the foot-motor causes a proportionate increase in the pressure acting on the end of the lever. Both foot-motors may of course be operated together or one at a time, as described, if differential braking is required.

To maintain the brakes in the "on" position, the hand-brake lever is operated to tension the cable connected to the centre of the bridge-piece. The bridge piece is moved upwardly, the ends of the beams secured thereto each pivoting about a piston rod, and the angular movement of the beams, through the knife-edges secured thereto, lifts each lever member equally to operate the valve in the manner herein described.

Having described my invention what I claim is:

1. A fluid pressure control valve unit comprising a housing containing an operating chamber adapted to be connected to a mechanism to be operated and a co-axial exhaust chamber adapted to be connected to exhaust, an exhaust valve between said chambers, an inlet valve controlling the flow of pressure fluid from a source into the operating chamber, a cradle axially slidable in the operating chamber and associated with said inlet valve, a spring urging the cradle in a direction to maintain said inlet valve closed against fluid pressure from the source and means associated with the inlet and exhaust valves movable in one direction by an operator to close the exhaust valve and compress the spring to remove the spring pressure from the inlet valve to allow said inlet valve to open and in the opposite direction by the fluid pressure in the operating chamber to cause the inlet valve to close.

2. A fluid pressure control valve unit comprising a housing containing an operating chamber adapted to be connected to a mechanism to be operated and a co-axial exhaust chamber adapted to be connected to exhaust, a co-axial passage between said chambers, an inlet connection adapted to be connected to a source of fluid pressure and communicating with said chamber, an inlet valve for said connection, a cradle axially slidable in the operating chamber and associated with said inlet valve, a compression spring urging the cradle in a direction to close the inlet valve, an exhaust valve seat in the exhaust chamber having a tubular portion slidably fitting in the passage between said two chambers and seating on the adjacent end of the cradle, an exhaust valve seating on said exhaust valve seat and a plunger associated with said exhaust valve and slidably passing through a hole in the exhaust chamber and projecting exterior of said housing, whereby a load on said plunger in one direction first closes the exhaust valve and then compresses the spring to remove the spring pressure from the inlet valve to allow said inlet valve to open and pressure fluid to flow into the operating chamber until the pressure in said chamber, acting on the face of the exhaust valve, overcomes the load on the plunger to move the exhaust valve and close the inlet valve.

3. A fluid pressure control valve unit according to claim 2 wherein the inlet connection extends diametrically across the operating chamber and wherein the inlet valve comprises a hole in the side of the inlet connection remote from the exhaust chamber and co-axial with said hambers, a ball seating on said hole and a cup-shaped member supporting the ball having a stem fitted in an extension of the cradle.

4. A fluid pressure control valve unit according to claim 3 wherein said inlet connection is provided with a part projecting exterior of the housing and said part is provided with a plurality of radially extending holes and a closely fitting gauze filter to prevent dirt and the like from entering said unit.

5. A fluid pressure control valve unit according to claim 2 wherein the relation between the spring rate and the projected transverse area of the movable portion of the valve unit exposed to fluid pressure tending to close the valve on the one hand and the projected transverse area of said portion exposed to fluid pressure tending to open the valve on the other hand is such that the load on the plunger varies substantially in proportion to the fluid pressure in the operating chamber.

6. A fluid pressure control valve unit according to claim 5 provided with a lever pivotable about one end of said housing and having a portion adjacent said end abutting the plunger whereby a mechanical advantage is obtained on loading the other end of said lever.

7. A fluid pressure control valve unit according to claim 6 wherein the combined area of the cradle and exhaust valve seat on which the operating chamber pressure reacts in one axial direction slightly exceeds the area in which said pressure reacts in the opposite direction.

8. A fluid pressure control valve unit having a pivotable lever according to claim 6 provided with remote control means which comprises a tubular member having one end secured to the end of said lever remote from the plunger and the other end slidable on a sleeve secured to the housing, a compression spring within said tubular member, a flanged member abutting the end of the spring adjacent the lever, a return spring interposed between the lever and part of the housing and a flexible cable passing through the sleeve having one end secured to the flanged member and the other end adapted to be attached to a hand lever or the like, whereby linear movement of the cable compresses the spring to load the end of the lever and operate the valve unit.

9. A fluid pressure control valve unit having a pivotable lever according to claim 6 provided with remote control means which comprises a cylinder secured to the housing, a piston slidable in said cylinder, a piston rod secured to said piston having its end pivotally connected to the end of the lever remote from the plunger and a nozzle at the base of the cylinder adapted to be connected to means for pressurizing fluid, whereby increase in pressure in the cylinder caused by operation of said means forces the piston up the cylinder to load the end of the lever and operate the valve unit.

10. A fluid pressure control valve unit according to claim 2 wherein the tubular portion of the exhaust valve seat within the exhaust chamber is provided with a radially outwardly extending flange and the seating portion of said valve seat is located at the outer periphery of said flange.

11. A fluid pressure control valve unit according to claim 2 having means for varying the compression of the spring said means comprising an adjusting screw threadably engaging in one end of the housing and having a stem passing fluid-tightly through a hole in said end and a movable spring-retaining member associated with one end of said spring and engaging said stem.

12. A fluid pressure control valve comprising four valve units in accordance with claim 2 and arranged side by side within a common housing, and having interconnected exhaust chambers adapted to be connected to a common exhaust, means adapted to connect pairs of alternate inlet connections to alternative sources of fluid pressure, means to operate each adjacent pair of valves simultaneously and means to connect each of the operating chambers to a mechanism to be operated.

13. A fluid pressure control valve according to claim 12 wherein the means to operate each adjacent pair of valves simultaneously comprises a bridge-piece pivotally fitted over each adjacent pair of exhaust valves said plunger having one end seated in a recess in said bridge-piece midway between the exhaust valves and the other end abutting one end of a lever pivotable about the end of the housing containing the plunger.

14. A fluid pressure control valve having a pivotable lever according to claim 13 suitable for the differential control of aircraft brakes and provided with combined means for hydraulically operating said valve and for parking said brakes, said combined means comprising a piston and cylinder mechanism associated with each of the levers, a piston rod secured to each piston, a beam having one end pivotally secured to the end of each piston rod and movable to pivot said beam on said piston rod, a U-shaped member pivotally secured to said beam and providing a knife-edge engaging with the end of the lever, conduit means adapted to connect the piston and cylinder mechanism with means for pressurizing fluid and cable means adapted to connect the centre of the bridge piece with a hand lever or the like, whereby movement of the piston moves the piston rod, beam and knife-edge to load the end of the lever and operate the valve and movement of the bridge-piece pivots the beams about the ends of the piston rods to again move the knife-edges and load the end of the lever.

References Cited in the file of this patent

UNITED STATES PATENTS

| Number | Name | Date |
|---|---|---|
| 1,486,303 | Ross | Mar. 11, 1924 |
| 1,927,700 | Dickinson | Sept. 19, 1933 |
| 2,293,226 | Thornhill | Aug. 18, 1942 |

FOREIGN PATENTS

| Number | Country | Date |
|---|---|---|
| 602,400 | Great Britain | 1948 |